US011679879B2

(12) United States Patent
Baharav et al.

(10) Patent No.: US 11,679,879 B2
(45) Date of Patent: Jun. 20, 2023

(54) VEHICLE SYSTEM

(71) Applicant: ISRAEL AEROSPACE INDUSTRIES LTD., Lod (IL)

(72) Inventors: Ehud Baharav, Ramat Gan (IL); Nir Tel Oren, Reut (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 660 days.

(21) Appl. No.: 16/618,867

(22) PCT Filed: Jun. 10, 2018

(86) PCT No.: PCT/IL2018/050633
§ 371 (c)(1),
(2) Date: Dec. 3, 2019

(87) PCT Pub. No.: WO2018/229753
PCT Pub. Date: Dec. 20, 2018

(65) Prior Publication Data
US 2021/0107653 A1    Apr. 15, 2021

(30) Foreign Application Priority Data

Jun. 12, 2017  (IL) ......................................... 252845

(51) Int. Cl.
*B64D 5/00* (2006.01)
*B64C 39/02* (2023.01)
(Continued)

(52) U.S. Cl.
CPC .............. *B64D 5/00* (2013.01); *B64C 39/024* (2013.01); *B64C 2211/00* (2013.01); *B64U 10/13* (2023.01); *B64U 70/20* (2023.01)

(58) Field of Classification Search
CPC ................ B64D 5/00; B64C 2201/027; B64C 2201/082; B64C 2201/128;
(Continued)

(56) References Cited

U.S. PATENT DOCUMENTS 2,843,337 A    7/1958  Bennett
3,070,326 A   12/1962  Arnold
(Continued)

FOREIGN PATENT DOCUMENTS

DE    102013000409 A1 *  7/2014  ............. B64C 27/20
DE    102013000409 A1    7/2014
(Continued)

OTHER PUBLICATIONS

International Search Report and Written Opinion from International Application No. PCT/IL2018/050633 dated Sep. 13, 2018.

*Primary Examiner* — Joshua J Michener
*Assistant Examiner* — Arfan Y. Sinaki
(74) *Attorney, Agent, or Firm* — Dorsey & Whitney LLP

(57) ABSTRACT

A payload elevator system and method are disclosed, configured for providing a plurality of alternative payload elevator configurations, each payload elevator configuration being configured for transporting a payload module. A composite air vehicle configuration is also provided, including a respective payload elevator configuration, the payload elevator configuration being defined by and provided by the payload elevator system, and also including at least one payload module reversibly engaged to the payload elevator configuration via a corresponding engagement and release system.

23 Claims, 8 Drawing Sheets

(51) Int. Cl.
  *B64U 10/13* (2023.01)
  *B64U 70/20* (2023.01)
(58) Field of Classification Search
  CPC ............ B64C 2211/00; B64C 39/0016; B64C 39/0025; B64C 39/0033; B64C 39/0041; B64C 39/005; B64C 39/0058; B64C 39/0075; B64C 29/0016; B64C 29/0025; B64C 29/0033; B64C 29/0041; B64C 29/005; B64C 29/0058; B64C 29/0075; B64C 37/02; B64U 70/20
  See application file for complete search history.

(56) References Cited

U.S. PATENT DOCUMENTS

| | | | |
|---|---|---|---|
| 5,000,398 A * | 3/1991 | Rashev | B64C 27/08 244/116 |
| 5,975,464 A * | 11/1999 | Rutan | B64C 39/02 244/120 |
| 9,205,922 B1 * | 12/2015 | Bouwer | B64C 37/02 |
| 9,475,575 B2 | 10/2016 | Rossi | |
| 9,630,712 B1 * | 4/2017 | Carmack | B64C 37/02 |
| 10,407,170 B2 * | 9/2019 | Hall | B64C 39/024 |
| 2003/0183719 A1 * | 10/2003 | Bevilaqua | B64D 5/00 244/2 |
| 2007/0221779 A1 * | 9/2007 | Ikeda | F04D 25/066 244/7 A |
| 2011/0315806 A1 * | 12/2011 | Piasecki | B64C 27/20 244/17.11 |
| 2014/0374532 A1 | 12/2014 | Duffy et al. | |
| 2015/0353197 A1 | 12/2015 | Alber | |
| 2016/0123182 A1 | 5/2016 | Samaritano et al. | |
| 2016/0311529 A1 * | 10/2016 | Brotherton-Ratcliffe | B64C 27/30 |

FOREIGN PATENT DOCUMENTS

| | | | |
|---|---|---|---|
| EP | 3090946 A1 | 11/2016 | |
| WO | 2011149544 A1 | 12/2011 | |
| WO | WO-2014080386 A2 * | 5/2014 | ........... B64C 39/024 |

\* cited by examiner

US 11,679,879 B2

VEHICLE SYSTEM

TECHNOLOGICAL FIELD

The presently disclosed subject matter relates to vehicles, in particular to air vehicles, more in particular to air vehicle systems including an air vehicle configured for carrying another air vehicle, and to methods for operating such systems.

BACKGROUND ART

References considered to be relevant as background to the presently disclosed subject matter are listed below:
 U.S. Pat. No. 3,070,326
 U.S. Pat. No. 2,843,337
 U.S. Pat. No. 9,475,575
 US 2015/0353197
 U.S. Pat. No. 5,000,398
 EP 3090946

Acknowledgement of the above references herein is not to be inferred as meaning that these are in any way relevant to the patentability of the presently disclosed subject matter.

BACKGROUND

It is well known that while vertical takeoff and landing (VTOL) aircraft have the capability to take off vertically, to land vertically, and often to hover, this capability can come at a relatively high price. For example, in some VTOL configurations the propulsion units that provide the VTOL capability can be oversized as compared with the propulsion units of similar aircraft that do not have VTOL capability. This can result in a weight penalty, as the VTOL engines are still carried by the aircraft in aerodynamic flight, such as in cruise for example. Vertical takeoff and hover can also be very costly in terms of fuel consumption, and these operations are limited by the size of the aircraft fuel tanks.

By way of general background U.S. Pat. No. 3,070,326 discloses a method of operating aircraft which includes employing an operational aircraft and an auxiliary lift aircraft adapted to form with the operational aircraft a composite aircraft structure. The operational aircraft at least has propulsion means to produce forward flight and aerofoil surfaces to generate lift aerodynamically by such flight. The auxiliary lift aircraft has jet reaction power plant means producing vertically directable jets to develop lift independently of lift forces generated aerodynamically by forward flight. The method further includes the steps of effecting take-off of the composite structure by operation of said jet reaction power plant means of the auxiliary lift aircraft, accelerating the composite structure after takeoff to a speed at which aerodynamic lift generated by air flow over the aerofoil surfaces is sufficient to support the operational aircraft in flight independently of lift from the auxiliary lift aircraft, deflecting said jets to produce jets inclined to the vertical and thus to produce both lift and propulsive, forces to effect in part at least said acceleration, and then separating the auxiliary lift aircraft from the operational aircraft.

General Description

According to a first aspect of the presently disclosed subject matter there is provided a payload elevator system for providing a plurality of alternative payload elevator configurations, each said payload elevator configuration being configured for transporting a payload module, the payload elevator system comprising:
 at least one body having an engagement and release system for selectively engaging and releasing the payload module with respect to each said body;
 a modular propulsion system including a plurality of propulsion module sets, each said propulsion module set comprising at least one propulsion module, and including a coupling system for selectively coupling and decoupling each said propulsion module set with respect to each said body in turn, each said propulsion module configured for providing the respective said propulsion module set with a respective module thrust;
 said payload elevator system being configured for enabling selectively and alternately coupling any one of a plurality of alternative combinations of said propulsion module sets to said body to thereby provide a corresponding plurality of alternative said payload elevator configurations,
 each said combination of said propulsion module sets being chosen from said plurality of propulsion module sets to thereby provide the corresponding said payload elevator configuration with a desired collective thrust, said desired collective thrust including a summation of the said module thrusts of at least a portion of the said propulsion modules of the respective said combination of said propulsion module sets, said desired collective thrust being sufficient at least for enabling the payload elevator configuration to transport the payload module to a desired altitude when coupled to the respective payload elevator configuration.

In at least some examples, the payload elevator system further comprises a controller configured for operating said engagement and release system for selectively releasing the payload module with respect to said body under predetermined conditions, the payload module having been previously engaged with respect to said body via said engagement and release system. For example, said controller is configured for operating said engagement and release system for releasing the payload module with respect to said body at said desired altitude.

Additionally or alternatively, for example, the payload elevator system is configured for providing a range of alternative payload elevator configurations corresponding to a range of thrust options for lifting a corresponding range of payload weights provided by the payload module.

Additionally or alternatively, for example, for at least one said payload elevator configuration the corresponding said combination of said propulsion module sets provides a corresponding said desired collective thrust for matching with a payload weight of the payload module.

Additionally or alternatively, for example, each said payload elevator configuration is further configured for releasing the payload module from the respective said at said desired altitude and returning to a base station.

Additionally or alternatively, for example, each propulsion module includes at least one gas turbine engine. For example, said gas turbine is a turbojet engine or a turbofan engine. In other examples each propulsion module can any one of: a rocket motor, ducted fan engine, propeller/engine unit.

Additionally or alternatively, for example, at least one said propulsion module set comprises one said propulsion module, or, each said propulsion module set comprises one said propulsion module.

Additionally or alternatively, for example, at least one said propulsion module set comprises a plurality of said propulsion modules, or, each said propulsion module set comprises a plurality of said propulsion modules.

Additionally or alternatively, for example, each propulsion module set comprises a plurality of said propulsion modules mounted to a mounting structure.

Additionally or alternatively, for example, said coupling system is configured for selectively coupling and decoupling each said propulsion module set with respect to at least one of a plurality of attachment sites on the body. For example, said body comprises a plurality of said attachment sites.

Additionally or alternatively, for example, a spatial orientation of each said propulsion module sets with respect to the body remains fixed once coupled thereto. Additionally or alternatively, for example, a spatial orientation of each said propulsion module with respect to the body remains fixed once coupled thereto.

Alternatively, for example, a spatial orientation of the propulsion module sets with respect to the body is variable, providing variable vectored thrust to the payload elevator configuration. For example, each propulsion module set is configured as being tiltable at the coupling system. Additionally or alternatively, the spatial orientation of the propulsion modules with respect to the body is variable, providing variable vectored thrust to the payload elevator configuration. For example, in each propulsion module set, the one or more propulsion modules thereof are tiltably mounted to the mounting structure.

Additionally or alternatively, for example, each said payload elevator module configuration is configured for returning to a base after releasing the payload module.

Additionally or alternatively, for example, each said payload elevator module configuration is configured as an air vehicle.

Additionally or alternatively, for example, each said payload elevator module configuration is configured as a VTOL vehicle.

Additionally or alternatively, for example, each said payload elevator module configuration is configured as an unmanned air vehicle (UAV), or each said payload elevator module configuration is configured as a manned air vehicle.

According to a second aspect of the presently disclosed subject matter there is provided a composite air vehicle configuration, comprising:

a respective payload elevator configuration, the payload elevator configuration being defined by and provided by the payload elevator system defined according to the first aspect of the presently disclosed subject matter, for example as disclosed above; and at least one said payload module reversibly engaged to said payload elevator configuration via the corresponding said engagement and release system.

In at least some examples, the payload module is an air vehicle.

Additionally or alternatively, for example, the payload module is a powered air vehicle. Alternatively, the payload module is an unpowered air vehicle.

Additionally or alternatively, for example, the payload module is in the form of an unmanned air vehicle, or, the payload module is in the form of a manned air vehicle.

Additionally or alternatively, for example, a first all-up weight of the payload module is a percentage of a second all-up weight of the composite air vehicle, wherein said percentage is greater than 50%. For example, said percentage is any one of 55%, 60%, 65%, 70%, 75%, 80%.

According to a third aspect of the presently disclosed subject matter there is provided a method for providing a plurality of alternative payload elevator configurations, each said payload elevator configuration being configured for transporting a payload module, the method comprising:

(a) providing a payload elevator system as defined according to the first aspect of the presently disclosed subject matter, for example as disclosed above;

(b) choosing a said combination of said propulsion module sets from said plurality of propulsion module sets;

(c) coupling said chosen combination of said propulsion module sets to said body to thereby provide the corresponding said payload elevator configuration with a desired collective thrust.

For example, the method further comprises engaging at least one said payload module to said payload elevator configuration to provide a composite air vehicle.

According to aspects of the presently disclosed subject matter there is provided a payload elevator system and method, configured for providing a plurality of alternative payload elevator configurations, each payload elevator configuration being configured for transporting a payload module. According to these or other aspects of the presently disclosed subject matter there is provided a composite air vehicle configuration, including a respective payload elevator configuration, the payload elevator configuration being defined by and provided by the payload elevator system, and also including at least one payload module reversibly engaged to the payload elevator configuration via a corresponding engagement and release system.

A feature of at least one example of the presently disclosed subject matter is that a payload elevator system is provided that is versatile and allows many different alternative variations of payload elevator configurations to be assembled to match payload module requirements.

Another feature of at least one example of the presently disclosed subject matter is that payload elevator configuration can be thrust-matched with the payload module weight, by choosing appropriate propulsion module sets, which in turn enables the all up weight of the payload elevator configuration to be minimized. In turn this allows the all-up weight of the payload module to be a very large percentage of all-up weight of the composite air vehicle.

Another feature of at least one example of the presently disclosed subject matter is that the corresponding payload elevator configuration only requires to transport the payload module to a desired altitude, and thereafter returns to the takeoff site or close thereto, without the need for providing the payload elevator configuration with large range or endurance requirements. This approach allows to minimize the fuel requirements of the payload elevator configuration since the flights can be made of short duration, which in turn allows the all up weight of the payload elevator configuration to be minimized. In turn this allows the all-up weight of the payload module to be a very large percentage of all-up weight of the composite air vehicle.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1:
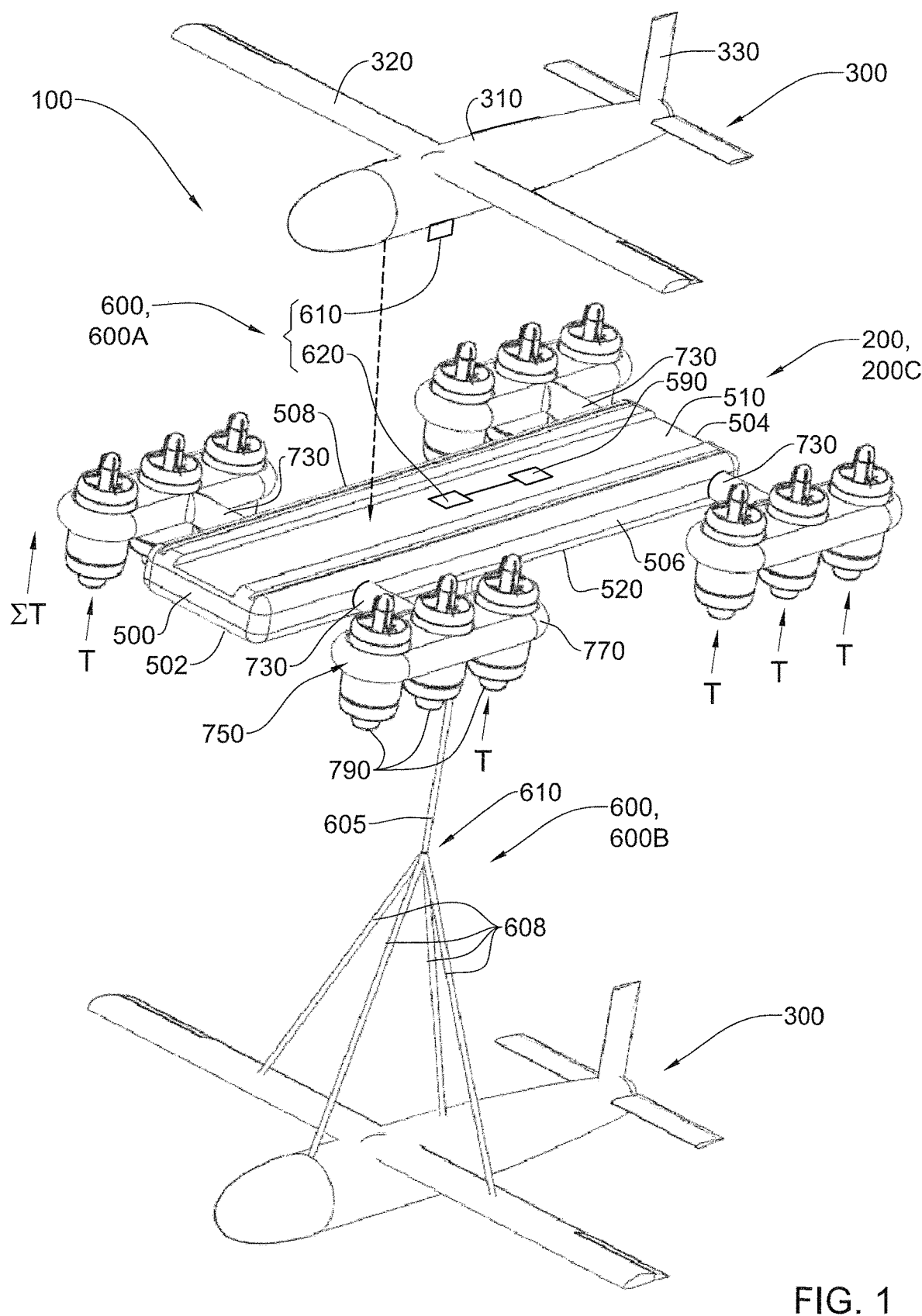
FIG. 1 illustrates, in isometric view, an example of a composite air vehicle according to an aspect of the presently disclosed subject matter.

According to a first aspect of the presently disclosed subject matter, and referring to FIG. 1, a composite air vehicle configuration according to a first example thereof of the presently disclosed subject matter, and generally designated 100, comprises a payload elevator configuration 200, and at least one payload module 300 reversibly engaged to the payload elevator configuration 200. For example, in the illustrated example of FIG. 1, the composite air vehicle configuration 100 can comprise two (or in alternative variations of this example more than two) payload modules 300, each independently and reversibly engaged to the payload elevator configuration 200.

Figure 2:
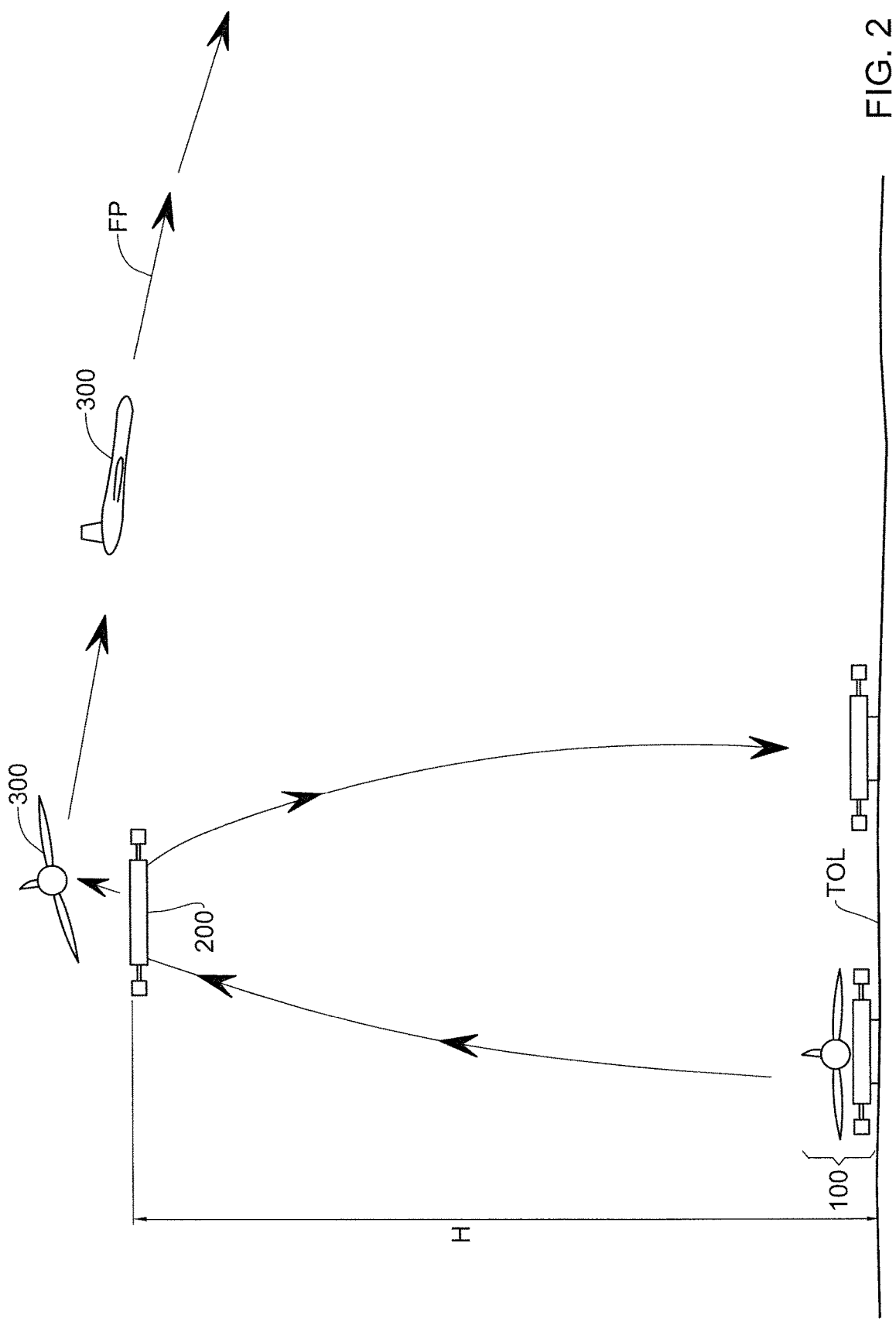
FIG. 2 schematically illustrates an example of operation of the composite air vehicle of FIG. 1.

As will become clearer herein, and referring to FIG. 2, in at least one operational mode of the composite air vehicle configuration 100, the payload elevator configuration 200 is in the form of an air vehicle, and operates to transport the one or more payload modules 300, when engaged thereto, from a takeoff location TOL to a predetermined altitude H. Thereafter, the payload elevator configuration 200 releases the payload module 300, allowing the payload module 300 to continue with its own mission and flight plan FP, while the payload elevator configuration 200 can return to the original takeoff location, or close thereto.

As will also become clearer herein, the payload elevator configuration 200 is configured as an air vehicle having a vertical takeoff and landing (VTOL) capability for transporting the payload module 300 to the predetermined altitude H, and thereafter to effect a landing. While in this example the landing is a controlled and powered VTOL landing, in alternative variations of this example the landing can be unpowered, for example via parachute, and/or the payload elevator configuration 200 can be configured for providing a non-VTOL landing, for example by gliding or conventional powered horizontal aerodynamic landing.

Figure 3:
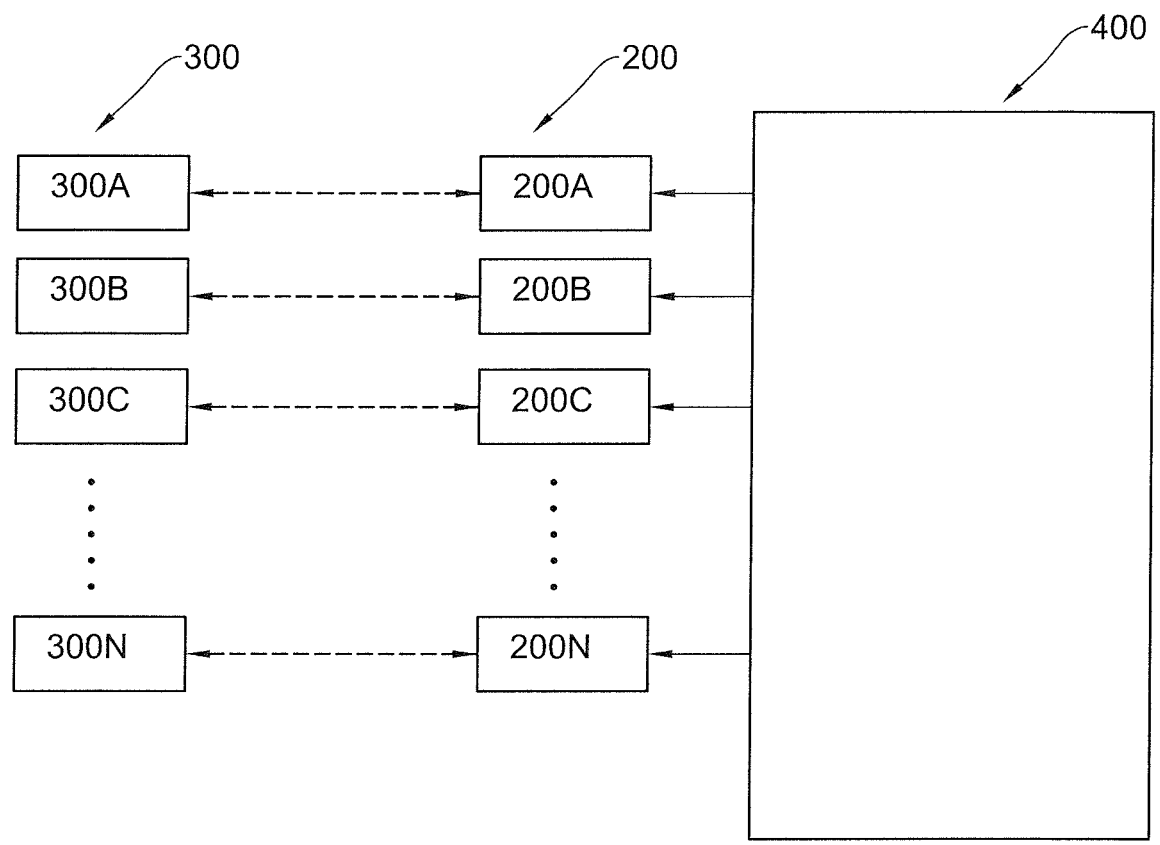
FIG. 3 schematically illustrates an example of a payload elevator system according to an aspect of the presently disclosed subject matter.

According to a second aspect of the presently disclosed subject matter, and also referring to FIG. 3, a payload elevator system according to a first example thereof of the presently disclosed subject matter, generally designated 400, is configured for providing a plurality of alternative payload elevator configurations, generally designated 200A, 200B, 200C . . . 200N (and individually or collectively designated also as 200). Each payload elevator configuration 200 is configured for transporting a corresponding one of a plurality of payload modules generally designated 300A, 300B, 300C . . . 300N (and individually or collectively designated also as 300).

Figure 4:
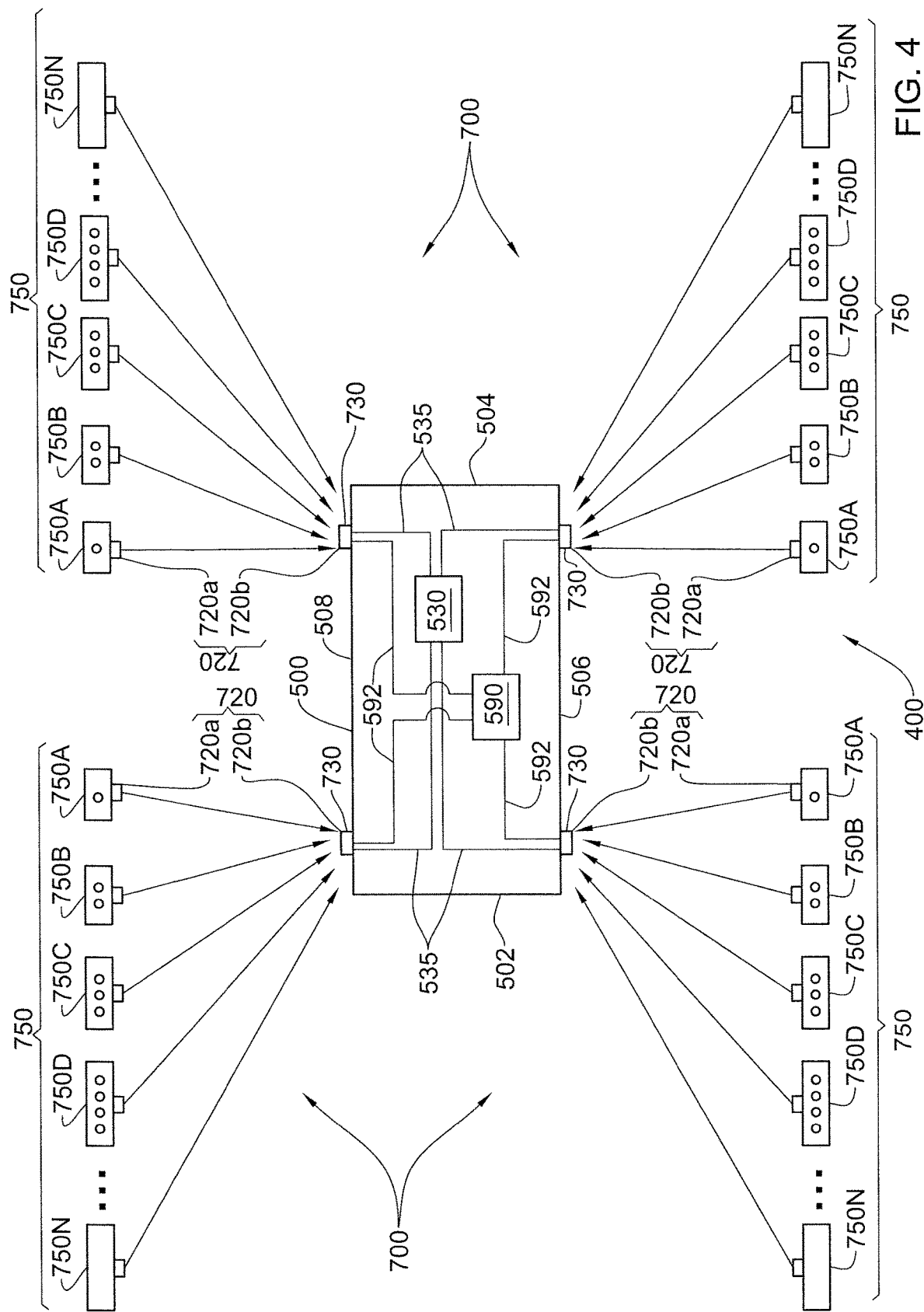
FIG. 4 schematically illustrates an example of a propulsion system and body of the payload elevator system of FIG. 3.

Referring in particular to FIGS. 1 and 4, the payload elevator system 400 comprises at least one body 500 and a modular propulsion system 700.

The modular propulsion system 700 includes a plurality of propulsion module sets 750, each said propulsion module set 750 comprising a mounting structure 770 and one or more propulsion modules 790 mounted to the mounting structure 770.

In operation thereof, each propulsion module 790 is configured for selectively providing the respective propulsion module set 750 with a respective module thrust T, when the propulsion module set 750 is coupled to the body 500.

In this example, all the propulsion modules 790 are similar to one another, and each provides the same nominal thrust T. However, in alternative variations of this example, the various propulsion modules 790 of the system 400 may be different from one another and/or can provide different levels of nominal thrust T.

In this example, each propulsion module 790 includes at least one gas turbine engine, for example a turbojet engine or a turbofan engine. In alternative variations of this example, the propulsion modules can instead comprise any one of: a rocket motor, ducted fan engine, propeller/engine unit, and so on.

For example, and referring in particular to FIG. 4, the modular propulsion system 700 includes:

at least four propulsion module sets 750, in which each said propulsion module set 750 is designated also with the reference numeral 750A and comprises one propulsion module 790;

at least four propulsion module sets 750, in which each said propulsion module set 750 is designated also with the reference numeral 750B and comprises two propulsion modules 790;

at least four propulsion module sets 750, in which each said propulsion module set 750 is designated also with the reference numeral 750C and comprises three propulsion modules 790;

at least four propulsion module sets 750, in which each said propulsion module set 750 is designated also with the reference numeral 750D and comprises four propulsion modules 790;

at least four propulsion module sets 750, in which each said propulsion module set 750 is designated also with the reference numeral 750N and comprises an integer number propulsion modules 790, in which said integer is an integer larger than 4, for example any integer in the range 5 to 10.

Figure 5:
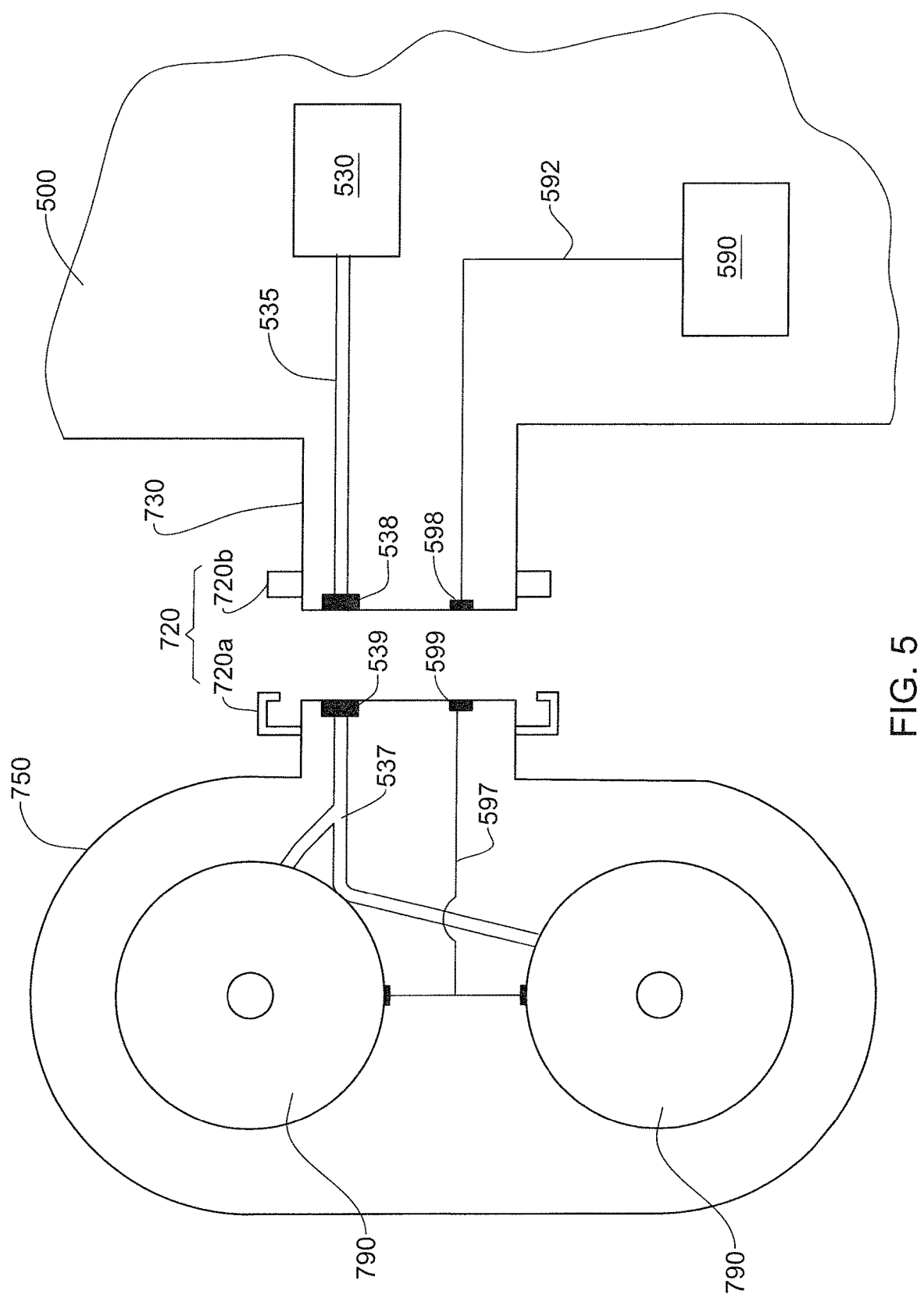
FIG. 5 schematically illustrates an example of a coupling system of the payload elevator system of FIG. 3.

In addition, and referring in particular to FIGS. 4 and 5, the modular propulsion system 700 comprises a coupling system 720 for selectively coupling and decoupling each propulsion module set 750 with respect to at least one of a plurality of attachment sites 730 on the body 500. For example, the coupling system 720 includes a plurality of body coupling elements 720b provided on the body 500, and a propulsion module coupling element 720a provided in each propulsion module set 750, in which each propulsion module set 750 to be mechanically coupled to the body 500. For example, the propulsion module coupling element 720a can include a plurality of hook elements that reversibly and lockingly engage with the body coupling elements 720b, in the form of a corresponding plurality of lugs. Alternatively, for example, the body coupling element 720b can include a plurality of hook elements that reversibly lockingly engage with the propulsion module coupling element 720a, in the form of a corresponding plurality of lugs. Alternatively, the body coupling elements 720b and the propulsion module coupling element 720a can include any other suitable configuration for mechanically coupling one to the other.

For example, a body coupling element 720b is provided at each attachment site 730 on the body 500, and each propulsion module set 750 (for example each one of the propulsion module sets 750A, 750B, 750C, 750D, 750N) also includes a corresponding propulsion module coupling element 720a.

Thus, any one of the four propulsion module sets 750A, or any one of the four propulsion module sets 750B, or any one of the four propulsion module sets 750C, or any one of the four propulsion module sets 750D, or any one of the four propulsion module sets 750N can be interchangeably coupled at any one time with the body 500 at any one of the attachment sites 730.

In at least this example, the coupling system 720 is configured not just to provide mechanical coupling of each propulsion module set 750 to the body 500, but also to provide coupling of control lines and fuel lines between the body 500 and the propulsion module sets 750 that are coupled to the body 500, as will become clearer below.

Thus, the payload elevator system 400 is configured for enabling selectively and alternately coupling any one of a plurality of alternative combinations of the propulsion module sets 750 to the body 500 to thereby provide a corresponding plurality of alternative payload elevator configurations 200.

Furthermore, each such combination of propulsion module sets 750 can be chosen from the plurality of propulsion module sets 750 of the payload elevator system 400 to thereby provide the corresponding payload elevator configuration 200 with a desired collective thrust ET, in particular a collective vertical thrust.

This desired collective thrust ET includes a summation of the module thrusts T of the operational propulsion modules 790 of the respective combination of propulsion module sets 750 that are engaged with the body 500. This desired collective thrust ET is at least sufficient for enabling the payload elevator configuration 200 to transport the desired payload module 300 to the desired altitude H when coupled to the respective payload elevator configuration 200.

According to an aspect of the presently disclosed subject matter, the payload elevator system 400 is configured for providing a range of alternative payload elevator configurations 200 corresponding to a range of thrust options for lifting a corresponding range of payload weights provided by the payload module 300. In other words a range of different alternative payload elevator configurations 200 can be assembled, one at a time, using the same body 200 and propulsion system 700. Choosing different combinations of propulsion module sets 750 to couple to the body 500 provides alternative thrust options, and the collective thrust ET provided by the respective payload elevator configuration 200 can thus be chosen within the aforementioned range of thrust options.

According to this aspect of the presently disclosed subject matter the collective thrust $\Sigma T$ provided by the payload elevator configuration 200 corresponds to a design thrust that matches, or exceeds, the all up weight of the respective payload module 300 (also taking into account the all-up weight of the payload elevator configuration 200 itself).

A first option is choosing a combination of propulsion module sets 750 from the system 400 in which the collective thrust $\Sigma T$ of all the respective propulsion modules 790 reaches the design thrust.

A second option is choosing a combination of propulsion module sets 750 from the system 400 in which the collective thrust $\Sigma T$ of only a portion of the respective propulsion modules 790 is required in order to reach the design thrust, and thus the remaining propulsion modules 790 are not necessarily operated to provide additional thrust. For example, such an option can be used where the remaining propulsion modules 790 are few in number, and thus there is little advantage in pursuing the first option at the cost of having to reconfigure the payload elevator configuration 200 by replacing one or more propulsion module sets. Additionally or alternatively, for example, the second option can be used to provide redundancy, and thus one or more of the remaining propulsion modules 790 can be used during flight when another propulsion module has failed or is faulty. Additionally or alternatively, for example, the second option can be used to enable a larger number of propulsion modules 790 to be operated at less than the nominal thrust to provide the same design thrust.

Referring again to FIGS. 1, 4, 5, the body 500 in this example is in the form of a rectangular platform, having a front end 502, a back end 504, port side 506, starboard side 508, upper side 510 and lower side 520. In this example, there are two longitudinally spaced attachment sites 730 on the port side 506, and two longitudinally spaced attachment sites 730 on the starboard side 508.

In alternative variations of this example, the body 500 can instead have an open-frame structure and/or have any other suitable shape.

In this example, the propulsion modules 790 are fuel powered, and correspondingly the body 500 includes a fuel system comprising at least one fuel tank 530, which can be accommodated within the body 500 or can be provided as an external stores, as well as fuel pumps. Fuel lines 535 extend between the fuel tank 530 to each one of the attachment sites 730, and end in a suitable fuel line body coupling 538 provided at or in proximity to the body coupling element 720b at the respective attachment sites 730.

In a complementary manner, each propulsion module coupling element 720a, provided for each propulsion module set 750, comprises a mating propulsion unit fuel line coupling 539 for selectively engaging with the respective fuel line body coupling 538 when the respective propulsion module set 750 is coupled to the respective attachment site 730 via the coupling system 720. Suitable fuel lines 537 connect the propulsion unit fuel line coupling 539 with each of the propulsion modules 790 of the respective propulsion module set 750. Thus, when each propulsion module set 750 is coupled to the respective attachment site 730 via the coupling system 720, fluid communication is established between the fuel lines of the respective propulsion modules and the fuel system via coupling of the propulsion unit fuel line coupling 539 with the fuel line body coupling 538, enabling the fuel system to pump fuel to each propulsion module.

While in this example, the payload elevator configuration 200 is configured as a UAV, in alternative variations of this example the payload elevator configuration 200 is configured as a manned air vehicle. Additionally or alternatively, while in this example, the payload elevator configuration 200 is configured as an air vehicle for operating in the atmosphere, in alternative variations of this example the payload elevator configuration 200 is instead configured for operating in a vacuum, for example as a space vehicle operating on an airless body, for example an asteroid or the moon.

In at least some examples, the body 500 also includes a controller 590 for controlling operation of the respective payload elevator configuration 200. The controller 590 can be manually or autonomously controlled to operate the payload elevator configuration 200, in particular to operate the propulsion module sets 750 thereof, providing thrust as well as suitable control moments in pitch, roll and yaw, and/or forwards motion and/or backward motion and/or sideslip, as required. In alternative variations of these examples the controller can be omitted, and the respective payload elevator configuration 200 is manned.

For example, the controller can comprise a suitable computer system, and is configured for controlling operation of the propulsion modules 790. The controller 590 is also configured to provide as stability and flight control of the payload elevator configuration 200, both on its own and also when the payload elevator configuration 200 is coupled to the payload module 300 to provide the composite air vehicle 100. A suitable power supply (e.g. batteries), as well as communication systems, navigational systems, GPS, sensors, and so on can be provided in operational connection with the controller 590.

Thus, suitable control lines 592 extend between the controller 590 and each one of the attachment sites 730, and end in a suitable control line body coupling 598 provided at the body coupling element 720a at the respective attachment sites 730. In a complementary manner, each propulsion module coupling element 720b provided in each propulsion module set 750, comprises a mating propulsion unit control line coupling 599 for selectively engaging with the respective control line body coupling 598 when the respective propulsion module set 750 is coupled to the respective attachment site 730 via the coupling system 720. Suitable control lines 597 connect the propulsion unit control line coupling 599 with each of the propulsion modules 790 of the respective propulsion module set 750. Thus, when each propulsion module set 750 is coupled to the respective attachment site 730 via the coupling system 720, contiguous control lines are established between the control lines of the respective propulsion modules and the controller 590, via coupling of the propulsion unit control line coupling 599 with the control line body coupling 598, enabling the controller 590 to control operation of each propulsion module 790.

Alternatively, the controller 590 can establish communication and control with the respective propulsion modules 750 via suitable wireless connection, and correspondingly the controller 590 and the respective propulsion modules 750 each have suitable wireless communication modules for so doing.

The type of propulsion module set 750 (for example how many propulsion modules 790 are provided in the specific propulsion module 750) that is coupled to each attachment site 730, and thrust output of the propulsion module set 750, can be input to the controller 590, enabling the controller 590 to determine how to adjust the thrust output and thrust distribution of the various propulsion modules 790.

For example, by controlling the propulsion module sets 750 to provide a differential thrust of the two aft-located propulsion module sets 750 with respect to the two front-located propulsion module sets 750, pitch control can be established.

For example, by controlling the propulsion module sets 750 to provide a differential thrust of the two port-located propulsion module sets 750 with respect to the two starboard-located propulsion module sets 750, roll control can be established.

For example, in examples where the propulsion module sets 750 and/or the corresponding propulsion modules 790 are tiltable with respect to the body 500 to provide variable vectored thrust to the payload elevator configuration 200, yaw control can be provided by varying the tilt angle of propulsion module sets 750 and/or of the corresponding propulsion modules 790.

The aforementioned input to the controller 590 can be automatically established when coupling the respective propulsion module sets 750 to the attachments sites, or can be input via a communications system (not shown), transmitted by the user.

In the example of the payload elevator configuration 200 illustrated in FIG. 1, the respective alternative payload elevator configuration 200, also generally designated 200C, comprises at each of the four attachment sites 730 of the body 500, a respective module set 750A having three propulsion modules 790.

Figure 6:
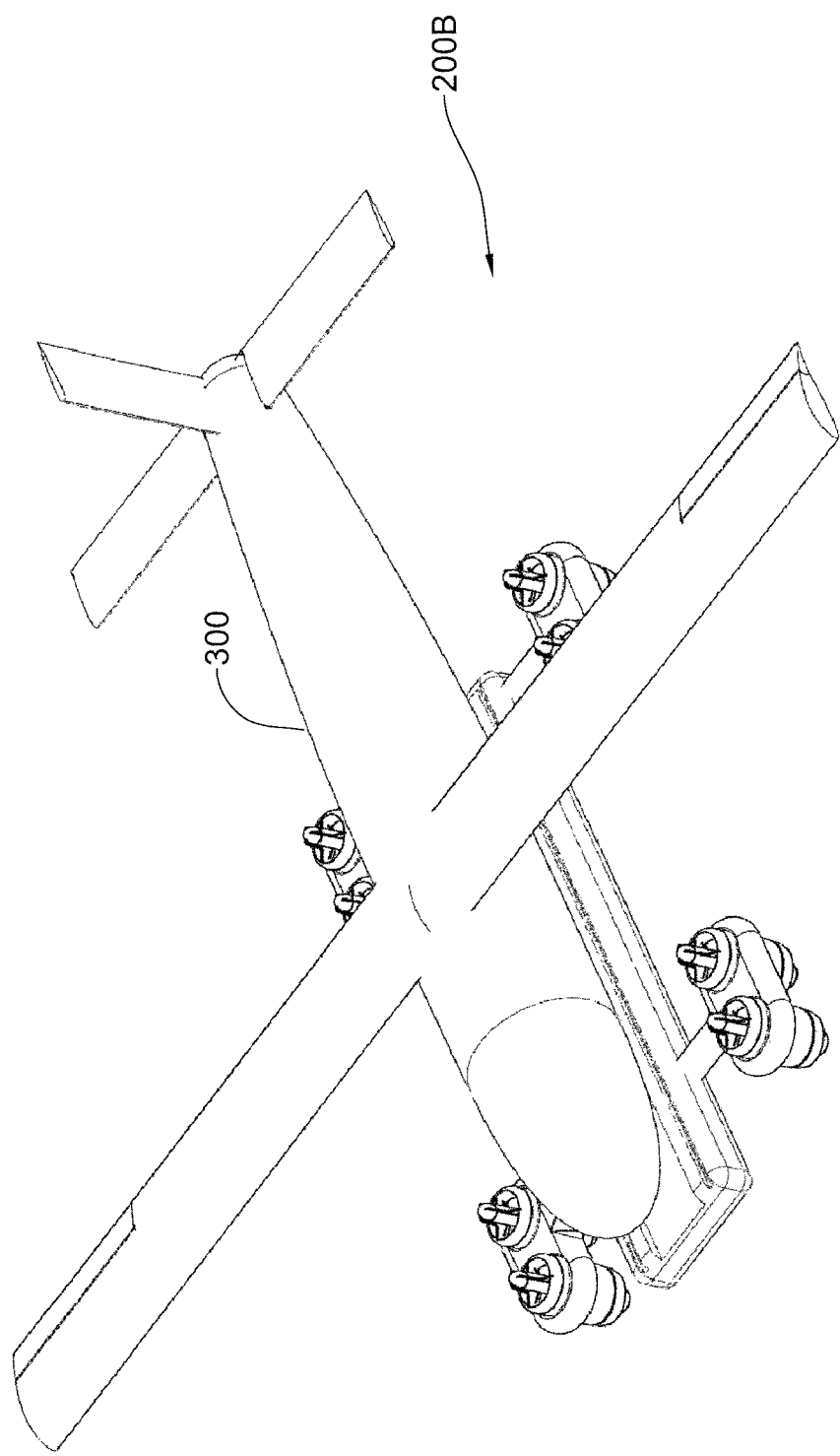
FIG. 6 illustrates, in isometric view, another example of a composite air vehicle according to an aspect of the presently disclosed subject matter.

In another example, illustrated in FIG. 6, the respective alternative payload elevator configuration 200, also generally designated 200B, instead comprises at each of the four attachment sites 730 of the same body 500, a respective module set 750A having two propulsion modules 790.

Figure 7:
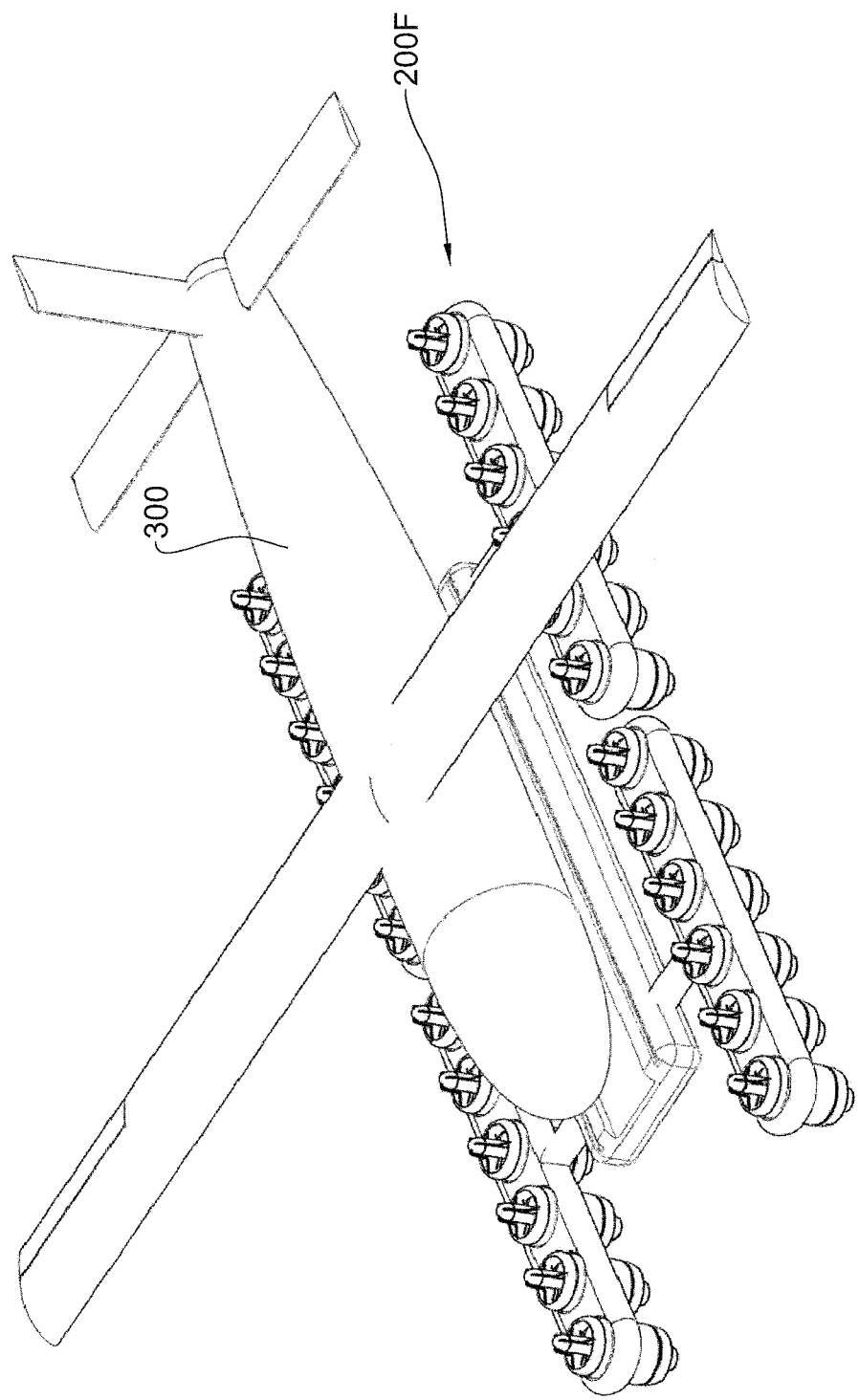
FIG. 7 illustrates, in isometric view, another example of a composite air vehicle according to an aspect of the presently disclosed subject matter.

In another example, illustrated in FIG. 7, the respective alternative payload elevator configuration 200, also generally designated 200F, instead comprises at each of the four attachment sites 730 of the same body 500, a respective module set 750A having six propulsion modules 790.

In each case, the payload elevator configuration 200 can include a suitable undercarriage (not shown) which can be provided in the body 500 and/or in each of the propulsion modules 790.

As schematically illustrated in FIG. 4, however, the respective alternative payload elevator configuration 200, can instead comprise at each of the four attachment sites 730 of the same body 500, a respective module set 750A having 1, 4, 5, 7, 8, 9, 10 or more than 10 propulsion modules 790.

In each of the examples illustrated in FIGS. 1, 6, 7 the respective propulsion module sets 750 at each of the respective attachments sites 730 have an equal number of propulsion modules 790 with respect to one another, and this enables the center of thrust (of the collective thrust generated by all the propulsion modules 790) to be provided at the geometrical center of the four propulsion module sets 750, which can also be at or close to the location of the center of gravity of the body 500 and thus at or close to the location of the center of gravity of the payload elevator configuration 200. Correspondingly, the payload module 300 can be mounted to the payload elevator configuration 200 with the center of gravity of the payload module 300 in registry with the center of gravity of the payload elevator configuration 200 and thus in registry with the center of thrust provided by the propulsion module sets 750.

In alternative variations of these examples the respective alternative payload elevator configuration 200 can instead comprise, at each of the four attachment sites 730 of the same body 500, respective module sets 750, in which the number of propulsion modules 790 in each of the four module sets 750 can be different from one another. For example, the two forward-mounted module sets 750 (i.e. closest to the front end 502) can each include 1, 2 or 3 propulsion modules 790, while the two aft-mounted module sets 750 (i.e. closest to the aft end 504) can each include 4, 5 or 6 propulsion modules 790. This longitudinal asymmetry in the number of propulsion modules 790 forward versus aft can have the effect of shifting in an aft direction the center of thrust (when all the propulsion modules 790 are generating thrust). Such a configuration can be useful, for example, when physical constraints prevent the center of gravity of the payload module 300 to be in registry with (and is in fact aft of) the geometric center or with center of gravity of the payload elevator configuration 200. In such cases, the asymmetric forward-aft distribution of propulsion modules can be chosen (for example by choosing a corresponding suitable combination of propulsion module sets 750 from the system 400) to at least bring the center of thrust into alignment or close to alignment with the center of gravity of the composite air vehicle configuration 100, i.e., when the payload module 300 is engaged to the payload elevator configuration 200. Thereafter, if additional alignment is required, the actual thrusts T produced by each of the individual propulsion modules 790 can be controlled by the controller 590 to thereby trim the composite air vehicle configuration 100.

In a similar manner, mutatis mutandis, the center of thrust can be shifted forward by providing greater thrust at the forward end, for example by providing propulsion module sets at the forward location having more propulsion modules 790 than the propulsion module sets that are aft-mounted.

In a similar manner, the center of thrust can be shifted in the port direction or in the starboard direction by providing greater thrust at the port side or at the starboard side respectively, for example by providing propulsion module sets at starboard location having a different number of propulsion modules 790 than in the propulsion module sets that are port-mounted.

Thus, the position of the center of thrust (in the forward-aft direction (i.e. along a longitudinal axis) and/or in the port-starboard direction (i.e., along a lateral axis)) can be controlled by choosing an appropriate combination of propulsion module sets 750 having an appropriate number of propulsion modules 790.

Additionally or alternatively, in alternative variations of these examples the respective alternative payload elevator configuration 200 can instead comprise a different arrangement for the four attachment sites 730. For example, the four attachment sites 730 (and thus the respective propulsion module sets 750 when coupled thereto) can be in cruciform arrangement (in plan view), with one attachment side being provided at each one of the front end 502, the aft end 504, the port side 506, and the starboard side 508.

Additionally or alternatively, in alternative variations of these examples the respective alternative payload elevator configuration 200 can instead comprise a different number and/or arrangement for the attachment sites 730. For example, the payload elevator configuration 200 can comprise two attachment sites 730, and thus two propulsion module sets 750 can be coupled to the respective body 500, for example along a longitudinal or transverse axis of payload elevator configuration 200 and intersecting the center of gravity thereof. Alternatively, for example, the payload elevator configuration 200 can comprise three attachment sites 730, and thus three propulsion module sets 750 can be coupled to the respective body 500, for example in triangular configuration in plan view, enclosing the center of gravity of the payload elevator configuration 200. Alternatively, for example, the payload elevator configuration 200 can comprise 3, 5, 6, 7, 8, 9, 10 or more than 10 attachment sites 730, and thus correspondingly 3, 5, 6, 7, 8, 9, 10 or more than 10 propulsion module sets 750, respectively can be coupled to the respective body 500.

Optionally, the shape of the body 500 can also correspond to the number of attachment sites 730 provided in the body 500. For example, (in plan view), the body can have a triangular, pentagonal, hexagonal, heptagonal, octagonal, nonagonal, or decagonal shape particularly when accommodating 3, 5, 6, 7, 8, 9, 10 attachment sites 730, or polygonal having more than 10 facets when accommodating more than 10 attachment sites 730. In each case, an attachment site 730 can be provided on each side of the corresponding shape or polygon.

It is also to be noted that the system 400 allows for only a portion of the attachment sites 730 to be fitted with propulsion module sets 750. For example, an example of the body 500 having six attachments sites 730 can be fitted with only 2, 3, 4, or 5 propulsion sets 750 to provide a corresponding payload elevator configuration 200.

It is to be noted that at least in some example, the plan shape of the body 500 does not have to correspond to the number of attachments sites 730 provided thereto, and instead the shape and size of the body can be designed to best fit the type of payload that it is desired to transport with the body 500. Thus, for example, the system 400 can include a plurality of bodies 500, each having different size and/or shape configurations and/or having different numbers of attachments sites 730.

Alternatively, the system 400 can include a plurality of bodies 500, each having the same size and/or shape configurations and/or having the same numbers of attachments sites 730.

Figure 8:
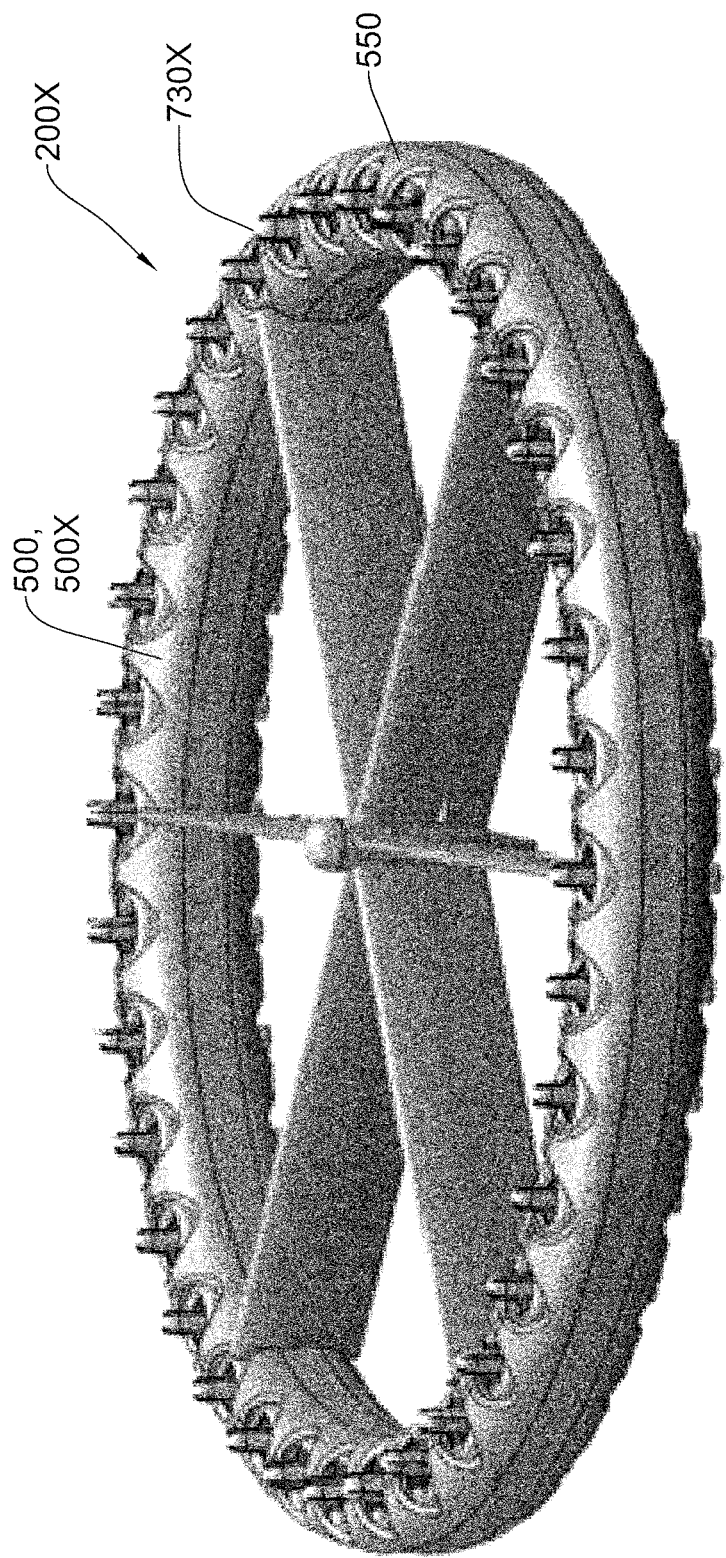
FIG. 8 illustrates, in isometric view, another example of a composite air vehicle according to an aspect of the presently disclosed subject matter.

Alternatively, and referring also to FIG. 8, the plan shape of the body 500, also designated in this figure with reference numeral 500X, can be circular, and any suitable number of attachment sites 730—for example 2, 3, 4, 5, 6, 7, 8, 9, 10 or more than 10—can be provided around the circular periphery 550 thereof, and optionally all or only a portion of the attachment sites 730X can be fitted with propulsion module sets 750. In the illustrated example, the body 500X has 36 attachment sites 730X (but can have any suitable number, for 24 attachment sites 730X), and in any case can be fitted with the full complement of 36 propulsion sets 750, or with a lower number, for example only 2, 3, 4, 5, 6, 7, 8, 9, 10, 11, 12 or any number up to 36 of propulsion sets 750 (one propulsion module set 750 at each of the chosen attachment sites 730) to provide a corresponding payload elevator configuration 200, also designated in this figure as 200X.

Referring again to FIG. 1, the payload elevator configuration 200, and in particular the body 500, comprises an engagement and release system 600 for selectively engaging and releasing the payload module 300 with respect to the payload elevator configuration 200, and thus with respect to the body 500, particular under flight conditions and/or at an altitude from the ground.

In one example, and referring in particular to FIG. 1, the engagement and release system 600 (also designated in this example with reference numeral 600A) is configured for selectively engaging and releasing the payload module 300 with respect to the body 500, wherein the payload module is in overlying relationship with the body 500 when engaged thereto, i.e., the payload module 300 is engaged via the engagement and release system 600 with the upper side 510 of the body 500, and thus the engagement and release system 600 is anhedrally disposed with respect to the body 500. A similar engagement configuration is illustrated in each one of FIGS. 6 and 7.

For example, the engagement and release system 600A can comprise explosive bolts via which the payload module 300 is bolted onto the body 500, and in which the explosive bolts shear explosively when required, to thereby release the payload module 300 from the body 500. Alternatively, the engagement and release system 600A can comprise a first engagement component 610 provided in the payload module 300, and a second engagement component 620 provided in the body 500. For example, the engagement and release system 600A can comprise a hook and lug system, wherein one of the first engagement component 610 and the second engagement component 620 is a selectively deployable/retractable hook element, and wherein the other one of the first engagement component 610 and the second engagement component 620 is a lug element, wherein the hook is releasably engageable in a deployed configuration with the lug to thereby engage the payload module 300 with the body 500, and when in a retracted configuration the hook element is released from the lug element. It is to be noted that in an alternative variation of this example, the engagement and release system 600A can be provided on the lower side 520, to releasably engage the payload module 300 below the body 500.

In another example, also illustrated in FIG. 1, the engagement and release system 600 (also designated in this example with reference numeral 600B) is configured for selectively engaging and releasing the payload module 300 with respect to the body 500 in a tethered manner, wherein the body 500 is in overlying relationship with the payload module 300 when engaged thereto. In other words, the payload module 300 is engaged via the engagement and release system 600 with the lower surface 520 of the body 500, and thus the engagement and release system 600 is dihedrally disposed with respect to the body 500. In particular, the engagement and release system 600B includes a suitable suspension cable arrangement 610 whereby the payload module 300 hangs below the body 500.

In this example the suspension cable arrangement 610 includes a main cable element 605 connected to the body 500 via the underside thereof, and the main cable element 605 branches off into a number of cable elements 608 having free ends of which are releasably engaged to hard points on the payload module 300. In alternative variations of this example, the suspension cable arrangement can comprise any other suitable tethering arrangement, for example comprising a single suspension cable interconnecting the body 500 and the payload module 300, or a plurality of individual suspension cables, each one independently interconnecting the body 500 and the payload module 300.

The actuation of the engagement and release system 600 (for example engagement and release system 600A and/or engagement and release system 600B) can be via a suitable signal or command from controller 590, or can be automatic and responsive to one or more criteria being met: for example: attainment of altitude H; elapsed time from take-off.

In the illustrated examples the spatial orientation of the propulsion module sets 750, and of the propulsion modules 790, with respect to the body 500 remains fixed once coupled thereto. However, in alternative variations of these examples, the spatial orientation of the propulsion module sets 750 with respect to the body 500 is variable, providing variable vectored thrust to the payload elevator configuration 200. For example, each propulsion module set 750 can be configured as being tiltable at the coupling system 720. Additionally or alternatively, the spatial orientation of the propulsion modules 790 with respect to the body 500 is variable, providing variable vectored thrust to the payload elevator configuration 200. For example, in each propulsion module set 750, the one or more propulsion modules 790 thereof are tiltably mounted to the mounting structure 770.

In the above examples the propulsion modules 790 can be provided in the form of high thrust to weight ratio engines, and the corresponding payload elevator configuration 200 can thus be configured with a thrust to weight ratio much larger than 1.0.

In the illustrated examples, the payload module 300 is configured as an air vehicle having aerodynamic flight capability, and can have any suitable aerodynamic configuration. For example, in the illustrated examples, the payload module 300 has a conventional subsonic configuration, comprising a fuselage 310 having a payload bay (not shown), lift-producing wings 320, and tail 330. However, in alternative variations of these examples, the payload module 300 can have any other suitable configuration.

Furthermore, the payload module 300 can optionally be unpowered, and thus can operate as a glider. Alternatively the payload module 300 is powered and has one or more suitable propulsion units.

While in these examples the payload module 300 is unmanned, for example in the form of a UAV, in alternative variations of these examples the payload module 300 is configured and operated as a manned vehicle, in particular as a manned air vehicle.

In yet other variations of the above examples the payload module 300 is configured as a blunt body, provided with a parachute or parasail to allow a soft landing after separation from the payload elevator configuration 200.

In yet other variations of the above examples the payload module 300 is configured as a lighter-than-air air vehicle, powered or unpowered, and includes gas sacks filled with helium, for example, to provide lighter-than-air capability.

In yet other variations of the above examples the payload module 300 is configured as a VTOL air vehicle, having at least powered vertical landing and/or hovering capability.

The payload elevator system 400 can be used as follows, for example. A particular mission requires a payload module 300 having an all-up weight W to be transported to an altitude H and released therefrom. The corresponding payload elevator configuration 200 is assembled from the payload elevator system 400 by:

(a) choosing a body 500 from the payload elevator system 400 that is appropriate, structurally, for supporting the weight W of the payload module 300, and capable of for supporting the accelerations and other forces which may be applied to the body 500 during operation thereof; the body 500 is also chosen with the appropriate engagement and release system 600 that is compatible with the payload module 300;

(b) choosing a combination of propulsion module sets 750 including a total number of propulsion modules in which the collective thrust $\Sigma T$ thereof is at least sufficient for enabling the payload elevator configuration 200 to transport the payload module 300 to the desired altitude H (in a desired period of time) when coupled to the respective payload elevator configuration 200;

(c) coupling the chosen propulsion module sets 750 to the chosen body 500 at the appropriate attachment sites 730 via the coupling system 720 to provide the payload elevator configuration 200;

(d) engaging the payload module 300 to the payload elevator configuration 200, in particular to the body 500, via the engagement and release system 600 to provide the corresponding composite air vehicle 100.

Thereafter, the composite air vehicle 100 can be operated, via controller 590, to generate the design thrust via the propulsion modules 790, allowing the composite air vehicle 100 to take off and reach the desired altitude H. Thereafter, the payload module 300 can be released by selectively actuating the engagement and release system 600, and the payload module 300 continues on its flight plan and mission, while the payload elevator configuration 200 returns and lands at or near the takeoff location, for example.

According to another aspect of the presently disclosed subject matter, the manner in which the payload module 300 is actually released from the payload elevator configuration 200 can depend on the specific configuration of the payload elevator configuration 200.

For example, in examples where the payload module 300 is configured as an air vehicle having aerodynamic flight capability, and is powered, the respective propulsion units of the payload module 300 can be powered up prior to release. Thus, at the release point the payload module 300 already has a certain level of forward thrust, and is capable of some forward motion to separate it from the payload elevator configuration 200. Thereafter, the payload module 300 can pick up speed, and perhaps lose some height while doing so, until aerodynamic flight conditions are reached, whereupon the payload module 300 is flown on its mission.

In examples where the spatial orientation of the propulsion module sets 750, and of the propulsion modules 790, with respect to the body 500 remains fixed once coupled thereto, such forward motion for the payload module 300 can be achieved by first pitching the payload module 300 in a slight nose-down pitch angle, and the propulsion modules thereby adopt a thrust vector having a horizontal component in the forward direction which provides the forward motion. Backwards motion is similar except that the payload module 300 in a slight nose-up pitch angle. Sideways motion in the port direction or the starboard direction can be achieved by rolling the payload module 300 in a slight pitch angle towards the respective direction, so that the propulsion modules thereby adopt a thrust vector having a horizontal component in the respective sideways direction which provides the sideways motion.

Alternatively, in examples where the propulsion module sets 750 and/or the corresponding propulsion modules 790 are tiltable (in pitch) with respect to the body 500 to provide variable vectored thrust to the payload elevator configuration 200, forward or backwards motion can be provided by varying the tilt angle of propulsion module sets 750 and/or of the corresponding propulsion modules 790 such that the thrust vectors have a horizontal component in the forward/aft direction which provides the forward/aft motion.

If the propulsion module sets 750 and/or the corresponding propulsion modules 790 are tiltable in yaw, then sideways motion, i.e., sideslip, can be similarly produced by tilting the propulsion module sets 750 and/or the corresponding propulsion modules 790 in yaw so that the propulsion modules thereby adopt a thrust vector having a horizontal component in the respective sideways direction which provides the sideways motion. If the propulsion module sets 750 and/or the corresponding propulsion modules 790 are only tiltable in pitch, then sideways motion, i.e., sideslip, can be produced by first initialing a 90 degree yaw maneuver, and then tilting the propulsion module sets 750 and/or the corresponding propulsion modules 790 in pitch so that the propulsion modules thereby adopt a thrust vector having a horizontal component in the respective sideways direction which provides the sideways motion.

For example, in examples where the payload module 300 is configured as an unpowered air vehicle having aerodynamic flight capability, the payload elevator configuration 200 can be tilted, for example in nose-down pitch at the release point. Thus, when released, the payload module 300 moves in a downward manner to attain forward motion to separate it from the payload elevator configuration 200.

Thereafter, the payload module 300 can pick up speed as a result of losing height, until aerodynamic gliding flight conditions are reached, whereupon the payload module 300 is flown as a glider on its mission. Alternatively, if the payload module 300 is coupled to the payload elevator configuration 200 in a tethered manner, in which the payload module 300 is suspended via a cable arrangement from the payload elevator configuration 200, there is no need for such tilting.

Alternatively, for example, in examples where the payload module 300 is configured as a powered or as an unpowered air vehicle having aerodynamic flight capability, the payload elevator configuration 200 can be tilted, for example in nose-up pitch while travelling in a forward direction at the release point. When the forward speed is sufficient for aerodynamic flight conditions, the payload module essentially detaches from the payload elevator configuration 200 on account of the induced lift. Thereafter the payload module 300 is flown as a powered air vehicle or as a glider, respectively, on its mission.

For example, in examples where the payload module 300 is configured as a blunt body, provided with a parachute or parasail, the payload elevator configuration 200 can be tilted, for example in nose-down pitch at the release point. Thus, when released, the payload module 300 moves in a downward manner to attain forward motion to separate it from the payload elevator configuration 200. Thereafter, the payload module 300 can pick up speed as a result of losing height, until the parachute or parasail opens and begins to operate, whereupon the payload module 300 drifts and does a soft landing, according to its mission. Alternatively, if the payload module 300 is coupled to the payload elevator configuration 200 in a tethered manner, in which the payload module 300 is suspended via a cable arrangement from the payload elevator configuration 200, there is no need for such tilting.

For example, in some examples the payload module 300 is configured with rocket-assist separation modules, which operate to provide the payload module 300 with a forward speed after being released from the payload elevator configuration 200, and thereafter can be jettisoned from the payload module 300.

For example, in examples where the payload module 300 is configured as a as a lighter-than-air air vehicle, powered or unpowered, the respective helium sacks can be inflated just prior to the release point, and thus when released, the payload module 300 moves away from payload elevator configuration 200. Thereafter, the payload module 300 is navigated according to its mission. This example allows the payload module in the form of a lighter-than-air air vehicle to achieve the desired altitude relatively quickly, for example.

In at least some examples, the useful payload of the composite air vehicle 100, i.e. the weight W of the payload module 300, can be a relatively large percentage of the total takeoff weight WO of the composite air vehicle 100. For example, this percentage can be greater than 50%, for example any one of 55%, 60%, 65%, 70%, 75%, 80%.

It is to be noted that since the payload elevator configuration 200 can operate to only transport the payload module 300 to the desired altitude H and then returns to the takeoff location or close thereto, the payload elevator configuration 200 only requires fuel to complete this task, and therefore the fuel tank and volume of fuel can be small, as compared with a VTOL air vehicle that is required to remain airborne for extended periods of time.

Further, in at least some examples, while the payload elevator configuration 200 can be configured to provide a fast lifting service to a relatively large payload weight of the payload module, in at least some cases the payload elevator configuration 200 is not required to be flown in a conventional manner between two geographical locations that are spaced apart in the order of kilometers, tens of kilometers, hundreds of kilometers or more. Accordingly, the payload elevator configuration 200 can be made of simple construction.

On the other hand, the payload elevator configuration 200 provides altitude to the payload module 300 so that the payload module 300 itself does not require the ability to attain this altitude by itself, which in turn allows the payload module 300 to have a larger range and/or endurance and/or higher payload weight than would otherwise be the case.

It is to be noted that each payload elevator configuration 200 can be operated to transport a series of similar payload modules 300, each one in turn being transported to a desired altitude H for release, and then returning to the takeoff location or close thereto. Thereafter the next payload nodule 300 can be coupled to the just-landed payload elevator configuration 200, which then transports this new payload module to its required altitude and after release thereof the payload elevator configuration 200 once again lands. This cycle can be repeated multiple times, and if necessary the payload elevator configuration 200 can be refueled in-between some or all of the trips. In this manner, a series of payload modules 300, which for example can be in the form of non-VTOL UAV's for example, are provided with a vertical take-off capability in an efficient and low cost manner, without the need to provide each UAV with a permanent VTOL capability that carries a corresponding weight and cost penalty.

It is to be noted that each payload elevator configuration 200 only requires fuel to complete the task of raising the payload module 300 to the required altitude and then releasing the payload from this altitude, and optionally doing a powered landing or an unpowered parachute landing, for example, and therefore the fuel tank and volume of fuel can be small, as compared with a VTOL air vehicle that is required to remain airborne for extended periods of time.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A payload elevator system for providing a plurality of alternative payload elevator configurations, each said payload elevator configuration being configured for transporting a payload module, the payload elevator system comprising:
   at least one body having an engagement and release system for selectively engaging and releasing the payload module with respect to the respective body;
   a modular propulsion system including a plurality of propulsion module sets, each said propulsion module set comprising at least one propulsion module, and including a coupling system for selectively coupling and decoupling each said propulsion module set with respect to each said at least one body in turn, each said propulsion module configured for providing the respective said propulsion module set with a respective module thrust;
   said payload elevator system being configured for enabling selectively and alternately coupling any one of a plurality of alternative combinations of said propulsion module sets to said at least one body to thereby provide a corresponding plurality of alternative said payload elevator configurations,
   each said combination of said propulsion module sets being chosen from said plurality of propulsion module sets to thereby provide the corresponding said payload elevator configuration with a desired collective thrust, said desired collective thrust including a summation of the said module thrusts of at least a portion of the said propulsion modules of the respective said combination of said propulsion module sets, said desired collective thrust being sufficient at least for enabling the payload elevator configuration to transport the payload module to a desired altitude when coupled to the respective payload elevator configuration; and
   a controller configured for selectively causing said engagement and release system to release the payload module from the respective said payload elevator configuration at said desired altitude from the ground and for causing the respective said payload elevator configuration to subsequently return to a base station.

2. The payload elevator system according to claim 1, wherein the controller is configured for operating said engagement and release system for selectively releasing the payload module with respect to said at least one body under predetermined conditions, the payload module having been previously engaged with respect to said at least one body via said engagement and release system.

3. The payload elevator system according to claim 1, configured for providing a range of alternative payload elevator configurations corresponding to a range of thrust options for lifting a corresponding range of payload weights provided by the payload module.

4. The payload elevator system according to claim 1, wherein for at least one said payload elevator configuration the corresponding said combination of said propulsion module sets provides a corresponding said desired collective thrust for matching with a payload weight of the payload module.

5. The payload elevator system according to claim 1, including one of the following:
   wherein each propulsion module includes at least one gas turbine engine; or
   wherein each propulsion module includes at least one gas turbine engine, and, wherein said gas turbine is a turbojet engine or a turbofan engine.

6. The payload elevator system according to claim 1, including one of the following:
   wherein at least one said propulsion module set comprises one said propulsion module; or
   wherein each said propulsion module set comprises one said propulsion module.

7. The payload elevator system according to claim 1, wherein at least one said propulsion module set comprises a plurality of said propulsion modules.

8. The payload elevator system according to claim 1, wherein each said propulsion module set comprises a plurality of said propulsion modules.

9. The payload elevator system according to claim 1, wherein each propulsion module set comprises a plurality of said propulsion modules mounted to a mounting structure.

10. The payload elevator system according to claim 1, wherein said coupling system is configured for selectively coupling and decoupling each said propulsion module set with respect to at least one of a plurality of attachment sites on the body.

11. The payload elevator system according to claim 10, wherein said at least one body comprises a plurality of said attachment sites.

12. The payload elevator system according to claim 1, wherein a spatial orientation of each said propulsion module sets or of each said propulsion module with respect to the body remains fixed once coupled thereto.

13. The payload elevator system according to claim 1, including one of the following:
   wherein a spatial orientation of the propulsion module sets with respect to the body is variable, providing variable vectored thrust to the payload elevator configuration;
   wherein a spatial orientation of the propulsion module sets with respect to the body is variable, providing variable vectored thrust to the payload elevator configuration, and, wherein each propulsion module set is configured as being tiltable at the coupling system;
   wherein a spatial orientation of the propulsion modules with respect to the body is variable, providing variable vectored thrust to the payload elevator configuration; or
   wherein a spatial orientation of the propulsion modules with respect to the body is variable, providing variable vectored thrust to the payload elevator configuration, and, wherein in each propulsion module set, the one or more propulsion modules thereof are tiltably mounted to the mounting structure.

14. The payload elevator system according to claim 1, including one of the following:
   wherein each said payload elevator module configuration is configured for returning to a base after releasing the payload module;
   wherein each said payload elevator module configuration is configured as an air vehicle;
   wherein each said payload elevator module configuration is configured as a VTOL vehicle;
   wherein each said payload elevator module configuration is configured as an unmanned air vehicle (UAV); or
   wherein each said payload elevator module configuration is configured as a manned air vehicle.

15. A composite air vehicle configuration, comprising:
   a respective payload elevator configuration, the payload elevator configuration being defined by and provided by the payload elevator system defined in claim 1, and
   at least one said payload module reversibly engaged to said payload elevator configuration via the corresponding said engagement and release system.

16. The composite air vehicle configuration according to claim 15, including one of the following:
   wherein the payload module is an air vehicle;
   wherein the payload module is a powered air vehicle;
   wherein the payload module is an unpowered air vehicle;
   wherein the payload module is an unmanned air vehicle; or
   wherein the payload module is a manned air vehicle.

17. The composite air vehicle configuration according to claim 15, including one of the following:
   wherein a first all-up weight of the payload module is a percentage of a second all-up weight of the composite air vehicle, wherein said percentage is greater than 50%; or
   wherein a first all-up weight of the payload module is a percentage of a second all-up weight of the composite air vehicle, wherein said percentage is greater than 50%, and, wherein said percentage is any one of 55%, 60%, 65%, 70%, 75%, or 80%.

18. A method for providing a plurality of alternative payload elevator configurations, each said payload elevator configuration being configured for transporting a payload module, the method comprising:
   providing the payload elevator system as defined in claim 1;
   choosing a said combination of said propulsion module sets from said plurality of propulsion module sets;
   coupling said chosen combination of said propulsion module sets to said at least one body to thereby provide the corresponding said payload elevator configuration with a desired collective thrust; and
   operating the respective payload elevator configuration to raise a payload module to a desired said altitude from the ground and to release the payload module from the respective said payload elevator configuration at said desired altitude from the ground, and for causing the respective said payload elevator configuration to subsequently return to a base station.

19. The method according to claim 18, further comprising engaging at least one said payload module to said payload elevator configuration to provide a composite air vehicle.

20. The payload elevator system according to claim 1, wherein a first all-up weight of the payload module is a percentage of a second all-up weight of a composite air vehicle comprising a desired said payload elevator configuration and payload module, wherein said percentage is greater than 50%.

21. The payload elevator system according to claim 1, wherein said coupling system is configured to provide coupling of control lines and fuel lines between the body and the propulsion module sets when coupled to the body, wherein the body includes a fuel system comprising at least one fuel tank.

22. The payload elevator system according to claim 21, wherein said fuel lines include first fuel lines extending between said fuel tank and each said attachment site, and wherein each said first fuel line end in a suitable fuel line body coupling provided at the respective attachment site, and wherein each said propulsion module set comprises a mating propulsion unit fuel line coupling for selectively engaging with the respective fuel line body coupling when the respective propulsion module set is coupled to the respective attachment site via the coupling system, and wherein respective second fuel lines connect the respective propulsion unit fuel line coupling with each of the propulsion modules of the respective propulsion module set.

23. A payload elevator system for providing a plurality of alternative payload elevator configurations, each said payload elevator configuration being configured for transporting a payload module, the payload elevator system comprising:
   at least one body having an engagement and release system for selectively engaging and releasing the payload module with respect to the respective body;
   a modular propulsion system including a plurality of propulsion module sets, each said propulsion module set comprising at least one propulsion module, and including a coupling system for selectively coupling and decoupling each said propulsion module set with respect to each said at least one body in turn, each said propulsion module configured for providing the respective said propulsion module set with a respective module thrust;

said payload elevator system being configured for enabling selectively and alternately coupling any one of a plurality of alternative combinations of said propulsion module sets to said at least one body to thereby provide a corresponding plurality of alternative said payload elevator configurations, each said combination of said propulsion module sets being chosen from said plurality of propulsion module sets to thereby provide the corresponding said payload elevator configuration with a desired collective thrust, said desired collective thrust including a summation of the said module thrusts of at least a portion of the said propulsion modules of the respective said combination of said propulsion module sets, said desired collective thrust being sufficient at least for enabling the payload elevator configuration to transport the payload module to a desired altitude when coupled to the respective payload elevator configuration;

said coupling system being configured to provide coupling of control lines and fuel lines between the body and the propulsion module sets when coupled to the body, and wherein the body includes a fuel system comprising at least one fuel tank; and wherein each said payload elevator configuration is further configured for releasing the payload module from the respective said payload elevator configuration at said desired altitude from the ground and returning to a base station.

* * * * *